United States Patent [19]

Dickerson

[11] Patent Number: 5,516,502
[45] Date of Patent: May 14, 1996

[54] SINGLET DELTA OXYGEN GENERATOR

[75] Inventor: Robert A. Dickerson, Canoga Park, Calif.

[73] Assignee: Rockwell International Corporation, Seal Beach, Calif.

[21] Appl. No.: 988,507

[22] Filed: Dec. 10, 1992

[51] Int. Cl.⁶ .................................................. C01B 13/00
[52] U.S. Cl. ............................... 423/579; 372/55; 372/89
[58] Field of Search .............................. 423/579; 372/89, 372/55

[56] References Cited

U.S. PATENT DOCUMENTS

| | | | |
|---|---|---|---|
| 3,560,876 | 2/1971 | Airey | 372/89 |
| 4,668,498 | 5/1987 | Davis | 423/579 |
| 4,975,265 | 12/1990 | Hed | 423/579 |

Primary Examiner—Wayne Langel
Attorney, Agent, or Firm—George A. Montanye; Harry B. Field; Steven E. Kahm

[57] ABSTRACT

A method and apparatus for generating excited singlet delta oxygen by effecting a chemical reaction between chlorine and basic hydrogen peroxide.

15 Claims, 3 Drawing Sheets

SINGLET DELTA OXYGEN GENERATOR

BACKGROUND OF THE INVENTION

This invention relates to chemical lasers and, more particularly, to a system for generating molecular oxygen in the excited singlet-delta electronic state for utilization by chemical lasers.

The mechanics of gas lasers are currently well known. Chemical lasers induce a lasing action by mixing an optically active lasing medium with an electronically excited energizing gas and then directing a flow of the resultant gaseous mixture into an optical laser cavity where the lasing action is generated. The lasing medium and the electronically excited gas react chemically to provide the necessary population inversion and lifetime required to create the lasing action.

Chemical laser systems have proven to be very useful for a number of applications and considerable interest in their development has evolved. The attendant problems associated with preparing, storing, maintaining and delivering the requisite reactant gases has hindered the application of chemical lasers particularly in airborne applications.

In overcoming the problems of providing simple, efficient and dependable sources of electronically excited energizing gases for chemical lasers, it has been found that a chemical reaction between chlorine gas and a basic solution of hydrogen peroxide will generate a stream of molecular oxygen in the excited singlet-delta electronic state. The excited oxygen can then be added to a suitable lasing medium and the mixture passed through an optical resonator to bring about a lasing action.

SUMMARY OF THE INVENTION

In accordance with the present invention, it has been found that molecular oxygen in the electronically excited singlet-delta electronic state, $O_2(^1\Delta)$, can be generated utilizing an apparatus and method which involves the flow of reactants such that chlorine gas flows through a basic solution of 20% to 30% $H_2O_2$. The resulting excited oxygen is suitable for use as the energizing, optically active media reactant for effecting population inversion in a laser by means of a chemical reaction. In the process of the present invention it is important to interact the liquid stream with the gaseous stream in an extremely vigorous forced convective manner, and to subsequently obtain a complete separation of the liquid from the gas. Vigorous convection is important because it is necessary to complete the liquid/gas reaction in a short period of time to avoid spontaneous decomposition of the excited oxygen. Complete separation of the product gas and the liquid is necessary because residual liquid in the gas stream would very adversely affect operation of a laser optical cavity. The supersonic injection of chlorine coupled with the cyclonic action within the reaction chamber of the instant invention provides the respective vigorous convective action and complete separation by means of centrifugal forces.

Accordingly, the primary object of this invention is to provide a method and apparatus for preparing a electronically excited gaseous medium for use as an energizing moiety in chemical lasers.

Another object of this invention is to provide a method for generating molecular oxygen in the excited singlet-delta electronic state.

The above and other objects and advantages of the present invention will become more readily apparent in view of the following detailed description of the invention in conjunction with the accompanying drawing.

DESCRIPTION OF THE PREFERRED EMBODIMENTS

Figure 1:
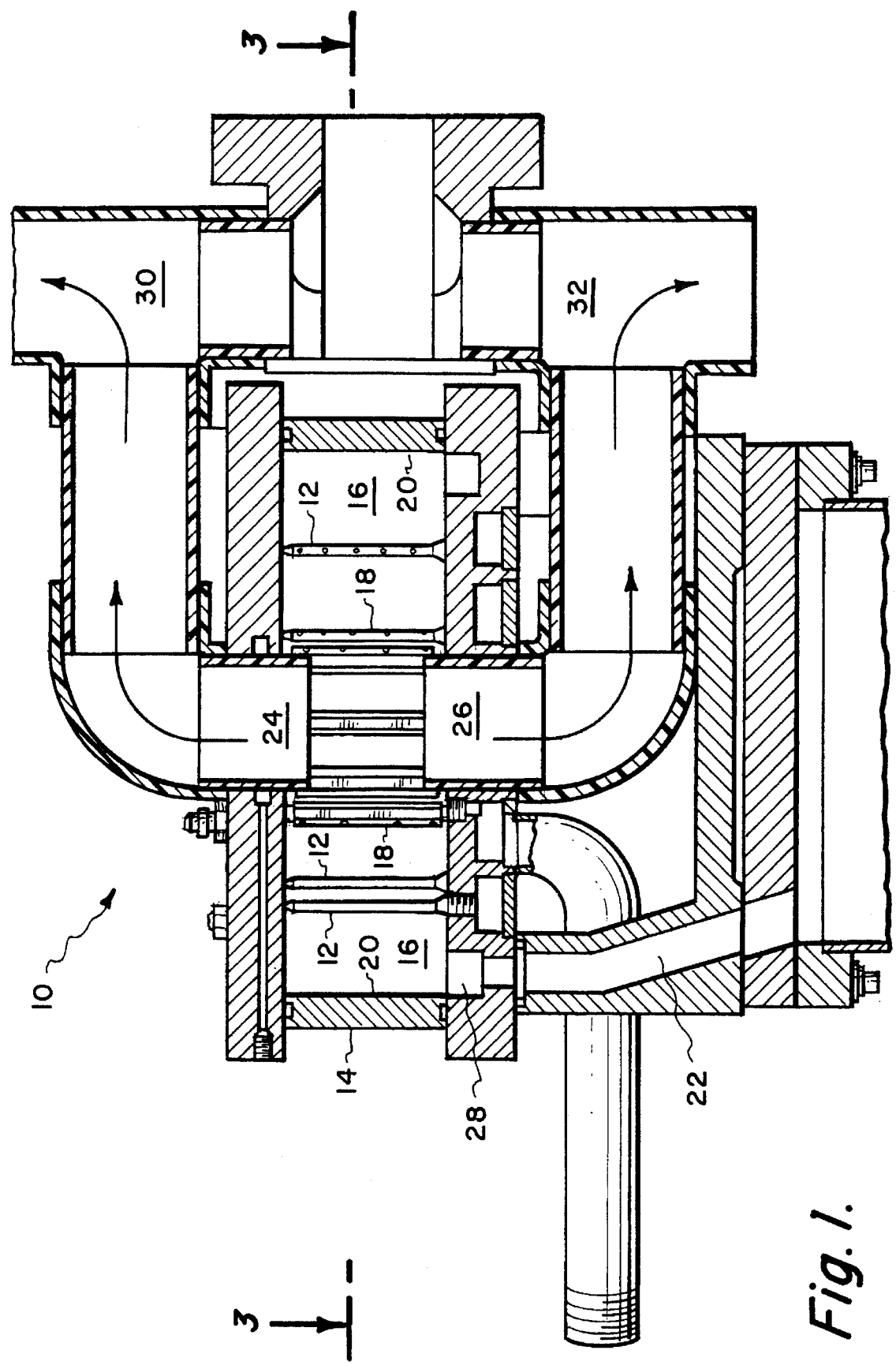
FIG. 1 is a schematic representation in cross section of the supersonic singlet delta oxygen generator of the present invention.
Figure 2:
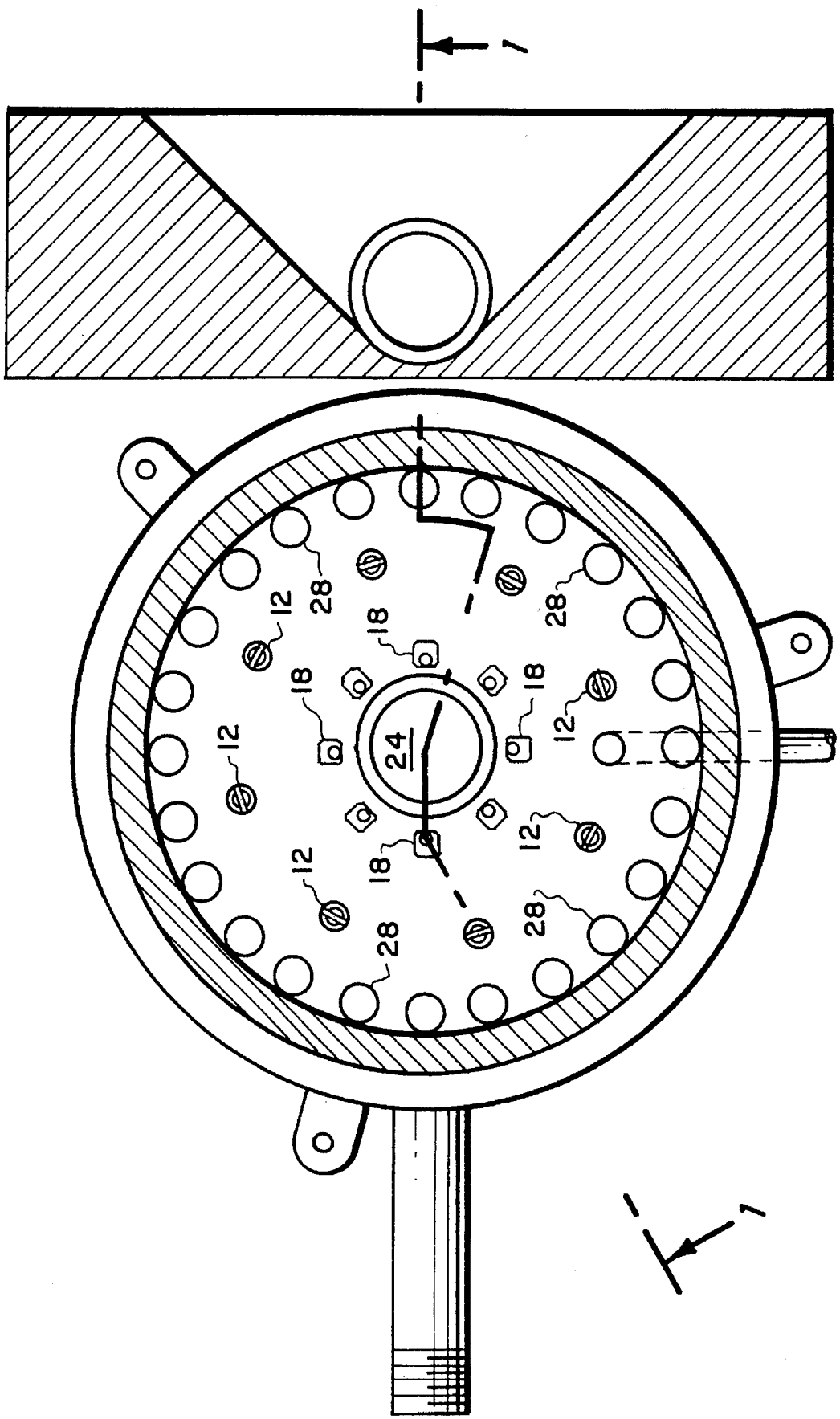
FIG. 2 is a partial top view of FIG. 1, taken along line 2—2, depicting the cyclonic reaction chamber of the singlet delta oxygen generator of the present invention.
Figure 3:
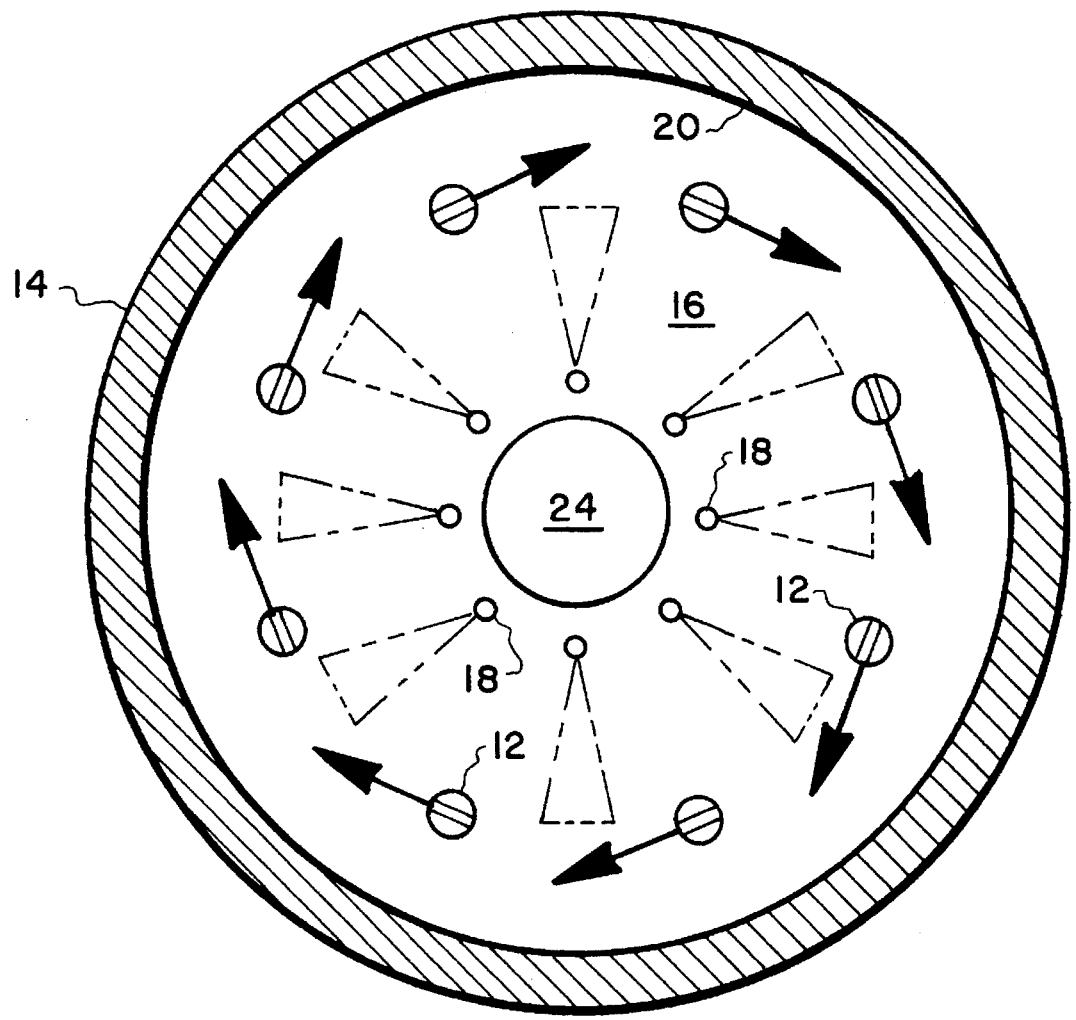
FIG. 3 is a partial schematic respresentation of the reaction chamber taken along line 3—3 of FIG. 1 further depicting the injection ports or jets for introducing reactants into the reaction chamber.

FIG. 1 depicts a schematic respresentration of a generator or apparatus 10 for producing singlet delta oxygen. Chlorine gas and, optionally and preferably, an inert gas such as argon, nitrogen or helium is injected through inlet jets 12 at high pressure into a reaction chamber 14 (see FIGS. 2 and 3), having an interior 16 and a constant circular cross-section. Jets of liquid basic hydrogen peroxide are injected through inlet jets 18 into the chlorine gas stream perpendicular to an inner radial wall 20 of the reaction chamber 14. The chlorine gas, which is being injected at supersonic velocity through jets 12 positioned in a generally circular configuration adjacent the inner radial wall 20 of the reaction chamber 14 reacts with the basic hydrogen peroxide to provide excited $O_2(^1\Delta)$. The gas and liquid reactants inside the chamber are caused to spin in a cyclonic manner, which spinning momentus is occasioned by directing the injected chlorine gas flow tangentially at the outer radius of the apparatus. The liquid hydrogen peroxide is also injected tangentially, but at a radius nearer to the center of the apparatus.

The liquid hydrogen peroxide, being much denser than the chlorine gas, spirals radially outward due to centrifugal force of rotation of the reaction gases to eventually impact and be collected on the inner wall 20. Tangential momentum of spray impacting the inner wall 20 and tangential gas flow friction keep the liquid hydrogen peroxide collected on the wall where it can be conveniently drained via outlet 22 and port 28 into a receiver vessel (not shown) even in a zero gravity environment.

The excited oxygen produced by the reaction of the chlorine gas and liquid hydrogen peroxide spirals radially inward as indicated by the arrows, into outlets 24,26 and then to exhaust ports 30,32 located on the axis of the reactor. Ever faster rotation of the gas mass as it nears the center of the reactor results in extremely intense centrifugal forces on any residual spray in the gas, separating even fine mist from the effluent gas flow.

Obviously, many modifications and variations of the present invention are possible in light of the above teachings. Thus, while the principle, preferred design and mode of operation of the invention have been explained and what is now considered to represent its best embodiment has been illustrated and described, it should be understood that, within the scope of the appended claims, the invention may be practiced otherwise than as specifically described.

What is claimed and desired to be secured by Letters

Patent of the United States is:

1. A method of producing singlet delta oxygen comprising the steps of:
   (a) injecting reactants comprising liquid basic hydrogen peroxide and gaseous chlorine at supersonic speed into a reactor having a constant circular cross section;
   (b) reacting the injected gaseous chlorine with the injected liquid basic hydrogen peroxide under supersonic flow conditions within the reactor in a cyclonic manner to form a flow of liquid droplets and gaseous singlet delta oxygen, the gaseous chlorine being injected tangentially to an outer radius of said reaction chamber via jets opening into said chamber near an inner radial wall thereof; and
   (c) separating said flow of liquid droplets and gaseous singlet delta oxygen into distinct separate flow streams.

2. The method of claim 1 wherein the gaseous chlorine is mixed with a carrier gas prior to injection into said reactor for reaction with basic hydrogen peroxide.

3. The method of claim 1 wherein said reacting step includes injecting the liquid basic hydrogen peroxide tangentially to an outer radius of said reaction chamber via jets opening into said chamber proximate the central axis of said reaction chamber.

4. The method of claim 1 further including the step of reducing the velocity of said stream of gaseous singlet delta oxygen to a subsonic level prior to introducing same into an optical cavity.

5. The method of claim 1 further including the step of collecting the liquid droplet flow stream after same impinges onto an inner wall surface of said reaction chamber.

6. The method of claim 1 further including the step of causing the removal of the aqueous singlet delta oxygen stream to an exhaust port located on the central axis of said reaction chamber.

7. The method of claim 3 wherein the gaseous chlorine is mixed with a carrier gas prior to injection into said reactor for reaction with basic hydrogen peroxide.

8. The method of claim 3 further including the step of reducing the velocity of said stream of gaseous singlet delta oxygen to a subsonic level prior to introducing same into an optical cavity.

9. The method of claim 3 further including the step of collecting the liquid droplet flow stream after same impinges onto an inner wall surface of said reaction chamber.

10. The method of claim 3 further including the step of causing the removal of the aqueous singlet delta oxygen stream to an exhaust port located on the central axis of said reaction chamber.

11. A method of producing singlet delta oxygen comprising the steps of:
    (a) injecting reactants comprising liquid basic hydrogen peroxide and gaseous chlorine at supersonic speed into a reactor having a constant circular cross section;
    (b) reacting the injected gaseous chlorine with the injected liquid basic hydrogen peroxide under supersonic flow conditions within the reactor in a cyclonic manner to form a flow of liquid droplets and gaseous singlet delta oxygen, the liquid basic hydrogen peroxide being injected tangentially to an outer radius of said reaction chamber via jets opening into said chamber proximate the central axis of said reaction chamber; and
    (c) separating said flow of liquid droplets and gaseous singlet delta oxygen into distinct separate flow streams.

12. The method of claim 11 wherein the gaseous chlorine is mixed with a carrier gas prior to injection into said reactor for reaction with basic hydrogen peroxide.

13. The method of claim 11 further including the step of reducing the velocity of said stream of gaseous singlet delta oxygen to a subsonic level prior to introducing same into an optical cavity.

14. The method of claim 11 further including the step of collecting the liquid droplet flow stream after same impinges onto an inner wall surface of said reaction chamber.

15. The method of claim 11 further including the step of causing the removal of the aqueous singlet delta oxygen stream to an exhaust port located on the central axis of said reaction chamber.

* * * * *